United States Patent
Du

(10) Patent No.: US 11,444,548 B2
(45) Date of Patent: Sep. 13, 2022

(54) SINGLE-PHASE DEVICE-MULTIPLEXING ACTIVE POWER DECOUPLING CASCADED RECTIFIER AND CONTROL METHOD THEREOF

(71) Applicant: SHANDONG UNIVERSITY, Shandong (CN)

(72) Inventor: Chunshui Du, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 17/275,447

(22) PCT Filed: Jun. 19, 2020

(86) PCT No.: PCT/CN2020/097204
§ 371 (c)(1),
(2) Date: Mar. 11, 2021

(87) PCT Pub. No.: WO2021/022915
PCT Pub. Date: Feb. 11, 2021

(65) Prior Publication Data
US 2022/0052620 A1   Feb. 17, 2022

(30) Foreign Application Priority Data

Aug. 6, 2019  (CN) .......................... 201910722126.2

(51) Int. Cl.
*H02M 7/219* (2006.01)
*H02M 7/217* (2006.01)
(Continued)

(52) U.S. Cl.
CPC ........... *H02M 7/219* (2013.01); *H02M 1/007* (2021.05); *H02M 7/05* (2021.05); *H02M 7/217* (2013.01)

(58) Field of Classification Search
CPC combination set(s) only.
See application file for complete search history.

(56) References Cited

U.S. PATENT DOCUMENTS 5,134,307 A * 7/1992 Nakano .................... H02J 9/062
   363/126
9,590,494 B1 * 3/2017 Zhou ....................... H02M 1/4208
(Continued)

FOREIGN PATENT DOCUMENTS

CN    101505106 A    8/2009
CN    103580502 A    2/2014
(Continued)

OTHER PUBLICATIONS

Mar. 4, 2020 Office Action issued in Chinese Patent Application No. 201910722126.2.
(Continued)

*Primary Examiner* — Gary A Nash
(74) *Attorney, Agent, or Firm* — Oliff PLC

(57) ABSTRACT

A single-phase device-multiplexing active power decoupling cascaded rectifier and control method thereof. The rectifier includes: n device-multiplexing active power decoupling H-bridge units that are cascaded, n≥2; each unit including: a bridge arm H1 and a bridge arm H2 connected in parallel, a decoupling capacitor branch formed by two capacitors connected in series, and a resistive load; a decoupling inductor being connected in series between a midpoint of the decoupling capacitor branch and a midpoint of bridge arm H2; and a bridge arm H1 of a first unit being sequentially connected in series to an inductor, resistor, and power supply, and then connected to a bridge arm H2 of a last unit. A power switch module of an H-bridge rectification unit is multiplexed, which not only realizes unit power factor rectification of the unit, but also provides a loop for sec- (Continued)

ondary ripple power to achieve secondary ripple power decoupling control.

8 Claims, 8 Drawing Sheets

(51) Int. Cl.
*H02M 1/00* (2006.01)
*H02M 7/04* (2006.01)

(56) References Cited

U.S. PATENT DOCUMENTS

| | | | |
|---|---|---|---|
| 2004/0095790 A1 | 5/2004 | Bakran et al. | |
| 2012/0008356 A1* | 1/2012 | Suntio | H02M 3/33507 363/131 |
| 2013/0063981 A1* | 3/2013 | Dujic | H02M 1/4233 363/16 |
| 2015/0171734 A1* | 6/2015 | Yu | H02M 1/4208 363/45 |
| 2017/0222545 A1* | 8/2017 | Haga | H02M 1/42 |
| 2018/0034359 A1* | 2/2018 | Chen | H03F 3/2173 |
| 2018/0076628 A1 | 3/2018 | Fu et al. | |

FOREIGN PATENT DOCUMENTS

| | | |
|---|---|---|
| CN | 103606956 A | 2/2014 |
| CN | 205407614 U | 7/2016 |
| CN | 107147101 A | 9/2017 |
| CN | 108777546 A | 11/2018 |
| CN | 109450265 A | 3/2019 |
| CN | 110034670 A | 7/2019 |
| CN | 110365231 A | 10/2019 |

OTHER PUBLICATIONS

Sep. 1, 2020 International Search Report issued in International Patent Application No. PCT/CN2020/097204.
Sep. 1, 2020 Written Opinion of the International Searching Authority issued in International Patent Application No. PCT/CN2020/097204.
Shi et al., "Single-stage Single-phase Inverter and Its Low-frequency Input Current Ripple Reduction," High Voltage Engineering, Jan. 31, 2019, vol. 45, No. 1, pp. 259-268.
Watson et al., "A Phase Shift Selective Harmonic Elimination Method for balancing capacitor voltages in a seven level Cascaded H-Bridge Rectifier," IEEE: 13th European Conference on Power Electronics and Applications, 2009.
Sun et al., "Current Ripple Reduction for Cascaded H-bridge Converter with Phase-Shifted Carrier PWM," IEEE: 4th Southern Power Electronics Conference, 2018.

* cited by examiner

SINGLE-PHASE DEVICE-MULTIPLEXING ACTIVE POWER DECOUPLING CASCADED RECTIFIER AND CONTROL METHOD THEREOF

BACKGROUND

Technical Field

The present invention relates to the technical field of power electronic traction transformers (PETTs), and in particular, to a single-phase device-multiplexing active power decoupling cascaded rectifier and a control method thereof.

Related Art

The description in this section merely provides background information related to the present invention and does not necessarily constitute the prior art.

PETT converts a power frequency alternating current (AC) transformer into a medium-high frequency transformer by using a power electronic conversion technology, to achieve electrical isolation and voltage class conversion, which has advantages such as a small size, a light weight, and a high power density as compared with a power frequency transformer. The topology structure of PETT mainly includes two major types: an AC-AC direct conversion topology and an AC-direct current (DC)-AC topology. The AC-AC topology has disadvantages such as low efficiency, poor controllability, low power quality, and relatively complex control policies. As a DC is introduced, which improves the system efficiency, the AC-DC-AC topology is easy to be modularized, and can be controlled more effectively.

A conventional power module of a switch has a low voltage withstand level, and a single power module cannot withstand a 27.5 kVac voltage of an electric locomotive. An H-bridge unit cascade mode is usually used to meet system voltage withstand requirements. Therefore, a single-phase H-bridge cascaded rectifier is highly favored in a PETT high voltage input rectification stage. However, one of inherent characteristics of a single-phase high-power factor rectifier is that a DC bus has a power pulsation that is twice a frequency of a grid-side voltage, thereby leading to large fluctuations of a secondary ripple voltage, and seriously affecting the transmission power of a converter and the voltage withstand safety of a power module. To suppress the secondary ripple voltage, a capacitor with a large capacitance or an LC resonator is usually directly connected to the DC bus in parallel. If an electrolytic capacitor is connected thereto in parallel, a withstand voltage is low and the service life is short. A film capacitor has a small loss, but has a large size and higher costs. If the LC resonator is connected thereto in parallel, because the LC resonator works in a resonance state of twice a power frequency, the frequency is low, the mass and size are large, and the LC resonator is sensitive to parameters and frequency, which is not conducive to reliable and stable system operation. Both of the methods limit an increase in power density of an on-board power electronic transformer.

SUMMARY

To resolve the above problems, the present invention provides a single-phase device-multiplexing active power decoupling H-bridge cascaded rectifier and a control method thereof, to ensure effective suppression of secondary ripple voltage pulsation, while improving a system power density.

An active power decoupling branch is added to a single-phase H-bridge cascaded rectifier, a new secondary ripple power loop is constructed by multiplexing an active power switching device without adding an additional power switching device, and ripple power is transferred to an energy storage unit to effectively reduce capacity of a DC-side bus voltage supported capacitor.

In some implementations, the following technical solutions are used:

A multi-module single-phase device-multiplexing active power decoupling cascaded rectifier is provided, including: n device-multiplexing active power decoupling H-bridge units that are cascaded, n≥2; each device-multiplexing active power decoupling H-bridge unit including: a bridge arm H1 and a bridge arm H2 connected in parallel, a decoupling capacitor branch formed by two capacitors connected in series, and a resistive load; a decoupling inductor being connected in series between a midpoint of the decoupling capacitor branch and a midpoint of the bridge arm H2; and an bridge arm H1 of a first device-multiplexing active power decoupling H-bridge unit being sequentially connected in series to an inductor Ls, a resistor Rs, and a power supply Us, and then connected to a bridge arm H2 of a last device-multiplexing active power decoupling H-bridge unit.

Further, a control method of a multi-module single-phase device-multiplexing active power decoupling cascaded rectifier is provided, including:

adding up instantaneous voltages outputted by a controller as a total system voltage through DC-side voltage closed-loop control;

generating, according to a deviation between an instantaneous voltage $P_{vi}$ of each cascaded H-bridge unit and a virtual average voltage, a DC bus voltage deviation modulation signal factor of each cascaded H-bridge unit;

generating a grid-side current reference value according to the total system voltage, calculating a difference between a grid-side inductor current and the grid-side current reference value, and generating a first modulation signal through a proportional resonance (PR) controller;

generating a reference value of a decoupling inductor current according to an instantaneous power $P_n$ of each cascaded H-bridge unit, calculating a difference between the decoupling inductor current and the reference value of the decoupling inductor current, and generating a modulated wave signal of a bridge arm H2 of each cascaded H-bridge unit through the PR controller;

generating a drive signal of a bridge arm H2 switching transistor that is used to drive decoupling and rectification of each cascaded H-bridge unit after comparing the modulated wave signal of the bridge arm H2 of each cascaded H-bridge unit with a carrier signal;

superimposing the modulated wave signal of the bridge arm H2 of each cascaded H-bridge unit onto the first modulation signal and then onto a respective DC bus voltage deviation modulation signal factor, to generate a modulated wave signal of a bridge arm H1 of each cascaded H-bridge unit; and generating a drive signal of a bridge arm H1 switching transistor that is used to drive rectification of each cascaded H-bridge unit based on the modulated wave signal of the bridge arm H1 of each cascaded H-bridge unit through a carrier phase-shifted modulation technology.

Further, a control system of a multi-module single-phase device-multiplexing active power decoupling cascaded rectifier is provided, including:

a second DC bus voltage control module, configured to add up instantaneous voltages outputted by a controller as a total system voltage through DC-side voltage closed-loop control;

a voltage balance control module, configured to generate, according to a deviation between an instantaneous voltage $P_{vi}$ of each cascaded H-bridge unit and an average voltage, a DC bus voltage deviation modulation signal factor of each cascaded H-bridge unit;

a second unit power factor rectification module, configured to generate a grid-side current reference value according to the total system voltage, calculate a difference between a grid-side inductor current and the grid-side current reference value, and generate a first modulation signal through a PR controller;

a second active power decoupling control module, configured to generate a reference value of a decoupling inductor current according to an instantaneous power $P_n$ of each cascaded H-bridge unit, calculate a difference between the decoupling inductor current and the reference value of the decoupling inductor current, and generate a modulated wave signal of a bridge arm H2 of each cascaded H-bridge unit through the PR controller;

a rectification bridge arm modulation signal generation module, configured to superimpose the modulated wave signal of the bridge arm H2 of each cascaded H-bridge unit onto the first modulation signal and then onto a respective DC bus voltage deviation modulation signal factor, to generate a modulated wave signal of a bridge arm H1 of each cascaded H-bridge unit;

a rectification bridge arm drive signal generation module, configured to generate a drive signal of the bridge arm H1 of each cascaded H-bridge unit based on the modulated wave signal of the bridge arm H1 of each cascaded H-bridge unit through a carrier phase-shifted modulation technology; and a decoupling bridge arm drive signal generation module, configured to generate a drive signal of the bridge arm H2 of each cascaded H-bridge unit after comparing the modulated wave signal of the bridge arm H2 of each cascaded H-bridge unit with a carrier signal.

Further, a terminal device is provided, including a processor and a computer-readable storage medium, the processor being configured to implement instructions, the computer-readable storage medium being configured to store a plurality of instructions, the instructions being adapted to be loaded by the processor to perform the foregoing control method.

Further, a computer-readable storage medium is provided, storing a plurality of instructions, the instructions being adapted to be loaded by a processor of a terminal device to perform the foregoing control method.

In some other implementations, the following technical solutions are used:

A single-phase device-multiplexing active power decoupling cascaded rectifier is provided, including: a bridge arm H1 and a bridge arm H2 connected in parallel, a decoupling capacitor branch formed by two capacitors connected in series, and a resistive load; a decoupling inductor being connected in series between a midpoint of the decoupling capacitor branch and a midpoint of the bridge arm H2; and a midpoint of the bridge arm H1 being sequentially connected in series to an inductor Ls, a resistor Rs, and a power supply Us, and then connected to the midpoint of the bridge arm H2.

Further, a control method of a single-phase device-multiplexing active power decoupling cascaded rectifier is provided, including:

generating a system voltage P in a circuit operation through DC bus voltage closed loop control;

respectively generating a grid-side current reference value and a reference value of a decoupling inductor current according to the system voltage P;

calculating a difference between a grid-side inductor current and the grid-side current reference value, and generating a first modulation wave through a PR controller;

comparing the decoupling inductor current and the reference value of the decoupling inductor current, and generating a second modulation wave through the PR controller;

superimposing the first modulation wave onto the second modulation wave for comparison with a carrier, and generating a first drive signal of a bridge arm H1 switching transistor that is used to drive rectification; and generating a second drive signal of a bridge arm H2 switching transistor that is used to drive decoupling and rectification after comparing the second modulation wave with the carrier.

Further, a control system of a single-phase device-multiplexing active power decoupling cascaded rectifier is provided, including:

a first DC bus voltage control module, configured to generate a system voltage P in a circuit operation through DC bus voltage closed loop control;

a first unit power factor rectification control module, configured to generate a grid-side current reference value according to the system voltage P, compare a grid-side inductor current with the grid-side current reference value, and generate a first modulation wave through a PR controller;

a first active power decoupling control module, configured to generate a reference value of a decoupling inductor current according to the system voltage P, compare the decoupling inductor current with the reference value of the decoupling inductor current, and generate a second modulation wave through the PR controller; and a first drive signal generation module, configured to superimpose the first modulation wave onto the second modulation wave for comparison with a carrier, generate a first drive signal of a bridge arm H1 switching transistor that is used to drive rectification, and generate a second drive signal of a bridge arm H2 switching transistor that is used to drive decoupling and rectification after comparing the second modulation wave with the carrier.

Further, a terminal device is provided, including a processor and a computer-readable storage medium, the processor being configured to implement instructions, the computer-readable storage medium being configured to store a plurality of instructions, the instructions being adapted to be loaded by the processor to perform the foregoing control method.

Further, a computer-readable storage medium is provided, storing a plurality of instructions, the instructions being adapted to be loaded by a processor of a terminal device to perform the foregoing control method.

Compared with the prior art, the present invention has the following beneficial effects:

Device-multiplexing active power decoupling is used. A power switch module of an H-bridge rectification unit is multiplexed, which not only realizes unit power factor rectification of the H-bridge rectification unit, but also provides a loop for secondary ripple power to achieve secondary ripple power decoupling control.

Through simulation verification, it can be seen that under an integrated control policy of DC-side voltage balance and device-multiplexing active power decoupling, a system can still implement DC-side voltage balance and secondary ripple power suppression under conditions of load unbalanced startup and sudden load changes during system operation, and effectiveness of the proposed control policy is verified.

DETAILED DESCRIPTION

It should be noted that the following detailed descriptions are all exemplary and are intended to provide a further understanding of this application. Unless otherwise specified, all technical and scientific terms used in the present invention have the same meaning as commonly understood by a person of ordinary skill in the art to which this application belongs.

It should be noted that the terms used herein are merely for describing specific implementations, and are not intended to limit exemplary implementations according to this application. As used herein, the singular form is also intended to include the plural form unless the context clearly dictates otherwise. In addition, it should be further understood that, terms "comprise" and/or "include" used in this specification indicate that there are features, steps, operations, devices, components, and/or combinations thereof.

Embodiment 1

Figure 1:
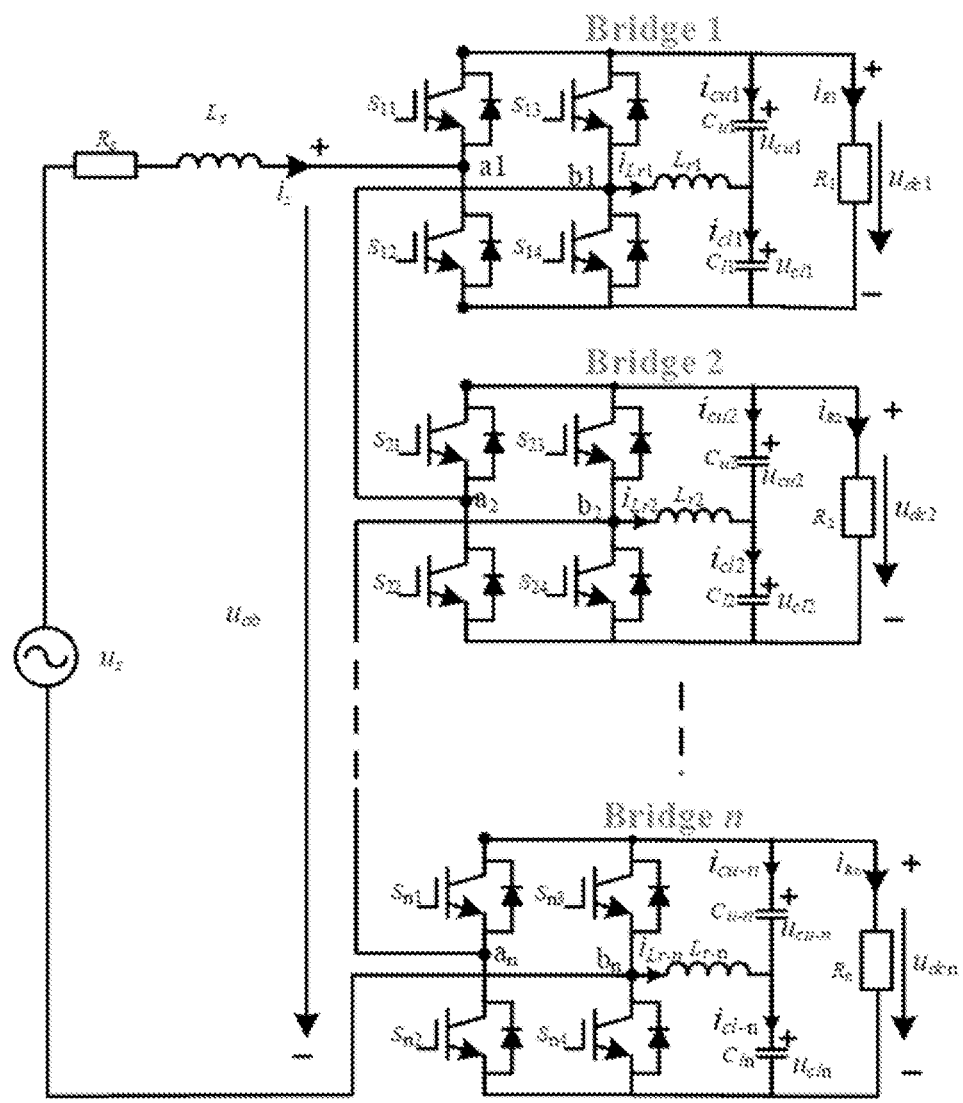
FIG. 1 is a schematic diagram of a topology of a multi-module single-phase device-multiplexing active power decoupling H-bridge cascaded rectifier in Embodiment 1.

In one or more implementations, a multi-module device-multiplexing active power decoupling single-phase H-bridge cascaded rectifier is disclosed, and a topology thereof is shown in FIG. 1, including: n device-multiplexing active power decoupling H-bridge units (Bridge 1, Bridge 2, . . . , and Bridge n) that are cascaded, DC-side capacitors $C_{u1}$, $C_{l1}$, . . . , $C_{u-n}$, and $C_{l-n}$ of the units being decoupling capacitors of Bridge 1, . . . , and Bridge n, and $u_{cu1}$, $u_{cl1}$, . . . , $u_{cu-n}$, and $u_{cl-n}$ being decoupling capacitor voltages; $L_{r1}$, . . . , and $L_{rn}$ being decoupling inductors, $i_{Lr1}$, . . . , and $i_{Lr-n}$ being currents flowing through the decoupling inductors $L_{r1}$, . . . , and $L_{rn}$; and $R_1$, . . . , and $R_n$ being DC-side resistive loads, and $u_{dc1}$, . . . , and $u_{dc-n}$ being DC-side output voltages.

A topology structure of the device-multiplexing active power decoupling H-bridge unit specifically includes: a bridge arm H1 and a bridge arm H2 connected in parallel, a decoupling capacitor branch formed by two capacitors connected in series, and a resistive load; a decoupling inductor being connected in series between a midpoint of the decoupling capacitor branch and a midpoint of the bridge arm H2.

A bridge arm H1 of a first device-multiplexing active power decoupling H-bridge unit is sequentially connected in series to an inductor Ls, a resistor Rs, and a power supply Us, and then connected to a bridge arm H2 of a last device-multiplexing active power decoupling H-bridge unit.

Figure 2:
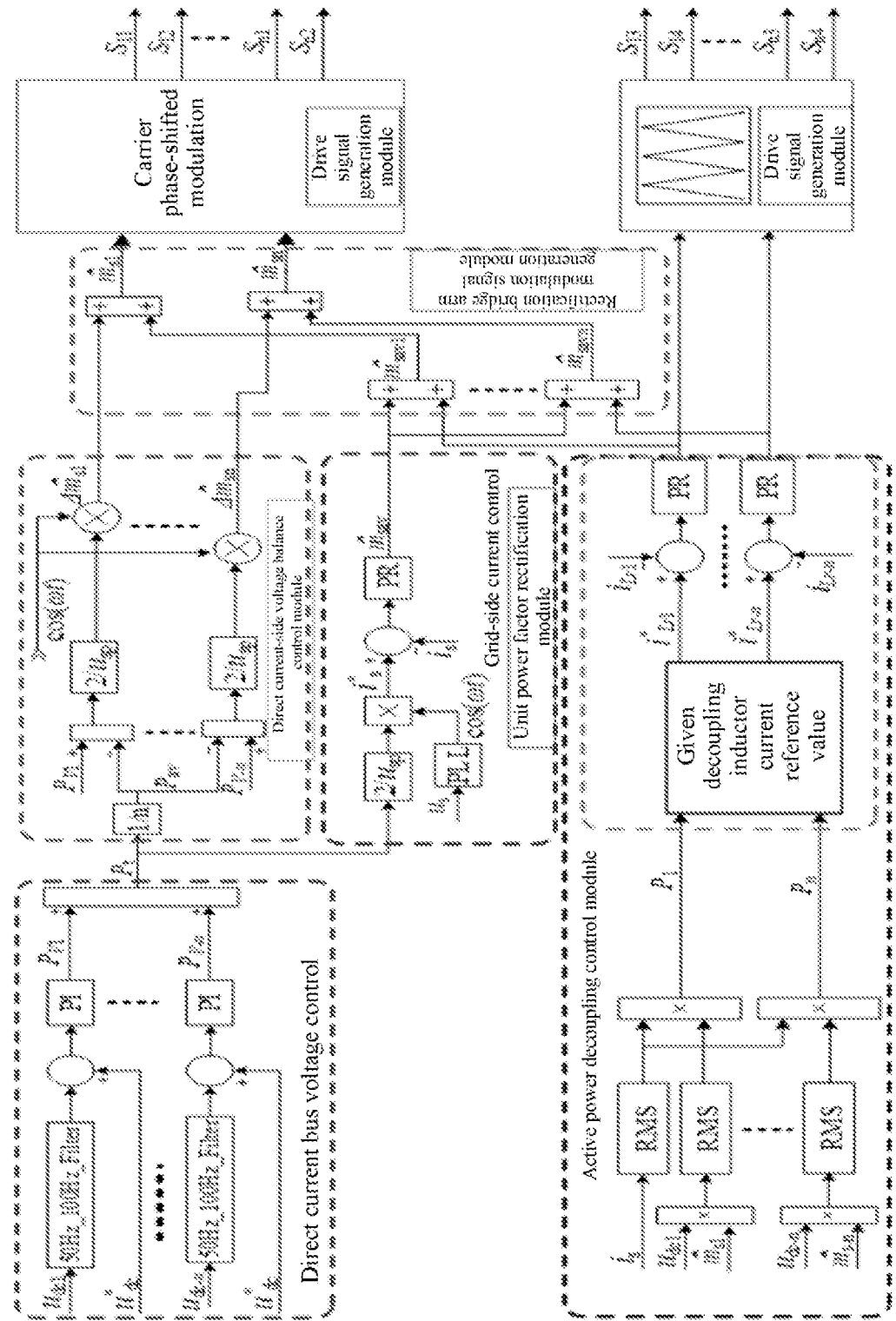
FIG. 2 is a schematic diagram of a control policy of a multi-module single-phase device-multiplexing active power decoupling H-bridge cascaded rectifier in Embodiment 1.

To realize voltage balance of capacitors of the cascaded units when loads are $R_1 \neq R_2 \neq \ldots \neq R_n$, suppress secondary ripple voltage pulsation of a DC bus of a cascaded unit, and ensure that the single-phase cascaded rectifier runs at unit power factors, an integrated control policy of multi-closed-loop multi-objective single-phase cascaded H-bridge rectifier voltage balance and device-multiplexing active power decoupling is provided, which includes three control objectives: first, performing grid-side current control, to implement a unit power factor rectification function; second, performing DC-side voltage equilibration control of the cascaded units, to ensure balance of DC bus voltages of the units when system parameters are inconsistent or the load changes suddenly, so that the system runs stably; third, performing active power decoupling control, to suppress DC-side voltage fluctuations. In a case of the same voltage ripple, a quantity of capacitors connected in parallel to the unit DC bus is reduced by 6 times or more, thereby improving a power density. A control system is shown in FIG. 2, and includes six modules in total: a DC bus voltage control module, a voltage balance control module, a unit power factor rectification module, an active power decoupling control module (for decoupling bridge arm modulation signal generation), a rectification bridge arm modulation signal generation module, and a power switching transistor drive signal generation module. The power switching transistor drive signal generation module includes: a rectification bridge arm drive signal generation module and a decoupling bridge arm drive signal generation module.

The DC bus voltage control module is configured to add up instantaneous voltages outputted by a controller as a total system voltage through DC-side voltage closed-loop control.

The voltage balance control module is configured to generate, according to a deviation between an instantaneous voltage $P_{Vi}$ of each cascaded H-bridge unit and a virtual average voltage, a DC bus voltage deviation modulation signal factor of each cascaded H-bridge unit. $P_{vi}$ is an instantaneous voltage outputted by a voltage controller.

The unit power factor rectification module is configured to generate a grid-side current reference value according to the total system voltage, calculate a difference between a grid-side inductor current and the grid-side current reference value, and generate a first modulation signal through a PR controller.

The active power decoupling control module is configured to generate a reference value of a decoupling inductor current according to an instantaneous power $P_n$ of each cascaded H-bridge unit, calculate a difference between the decoupling inductor current and the reference value of the decoupling inductor current, and generate a modulated wave signal of a bridge arm H2 of each cascaded H-bridge unit through the PR controller. $P_n$ is an instantaneous power of active power decoupling.

The rectification bridge arm modulation signal generation module is configured to superimpose the modulated wave signal of the bridge arm H2 of each cascaded H-bridge unit onto the first modulation signal and then onto a respective DC bus voltage deviation modulation signal factor, to generate a modulated wave signal of a bridge arm H1 of each cascaded H-bridge unit.

The rectification bridge arm drive signal generation module is configured to generate a drive signal of the bridge arm H1 of each cascaded H-bridge unit based on the modulated wave signal of the bridge arm H1 of each cascaded H-bridge unit through a carrier phase-shifted modulation technology.

The decoupling bridge arm drive signal generation module is configured to generate a drive signal of the bridge arm H2 of each cascaded H-bridge unit after comparing the modulated wave signal of the bridge arm H2 of each cascaded H-bridge unit with a carrier signal.

The working principle of the control system is: adding up, by the DC bus voltage control module, instantaneous voltages $P_{Vi}$ (i=1, 2, ... n) outputted by a controller as a total system voltage $P_t$ through DC-side voltage closed-loop control; generating, by the DC-side voltage balance control module, according to a deviation between an instantaneous voltage $P_{Vi}$ of each cascaded unit and a virtual average voltage $P_{av}$ ($P_{av}=P_t/n$), a respective DC bus voltage deviation modulation signal factor $\Delta m_{si}$; changing, by the unit power factor rectification module, a modulation degree $m_{sav}$ through a PR controller to control a grid-side inductor current to follow a current reference value $i^*_s$; and generating, by the active power decoupling control module, decoupling inductor current reference values $i^*_{Lr1}$ and $i^*_{Lr2}$ according to a real-time power outer loop, control currents of decoupling inductors $L_{r1}$ and $L_{r2}$ to follow given values, and generate a modulated wave signal of a decoupling bridge arm through the PR controller;

superimposing, by the rectification bridge arm modulation signal generation module, the modulated wave signal $m_{sav}$ generated by the unit power factor rectification module onto a signal outputted by an active power decoupling control regulator, modulation signals $m_{sav1}$, $m_{sav2}$, ..., and $m_{savn}$ generated by the two units, and deviation modulation signals $\Delta m_{s1}$ and $\Delta m_{s2}$ generated by the voltage balance module, to finally generate modulation signals $m_{s1}$ and $m_{s2}$ of the rectification bridge arms.

The drive signal generation module includes two parts: a rectification bridge arm drive signal and a decoupling bridge arm drive signal. The rectification bridge arm uses a carrier phase-shifted modulation algorithm. A triangular carrier of Bridge n lags 180°/n behind that of Bridge 1, which are compared with a modulated wave to generate a drive signal of a rectification bridge arm of each unit. Under unit power factor rectification conditions, a decoupling capacitor AC voltage component and a grid-side power voltage phase angle θ are determined, decoupling control between units is not affected by unit power factor rectification, power decoupling control between the units has no coupling, and a modulation signal outputted by a decoupling inductor current loop between the units is directly compared with the carrier to generate a decoupling bridge arm drive signal.

Figure 3A:
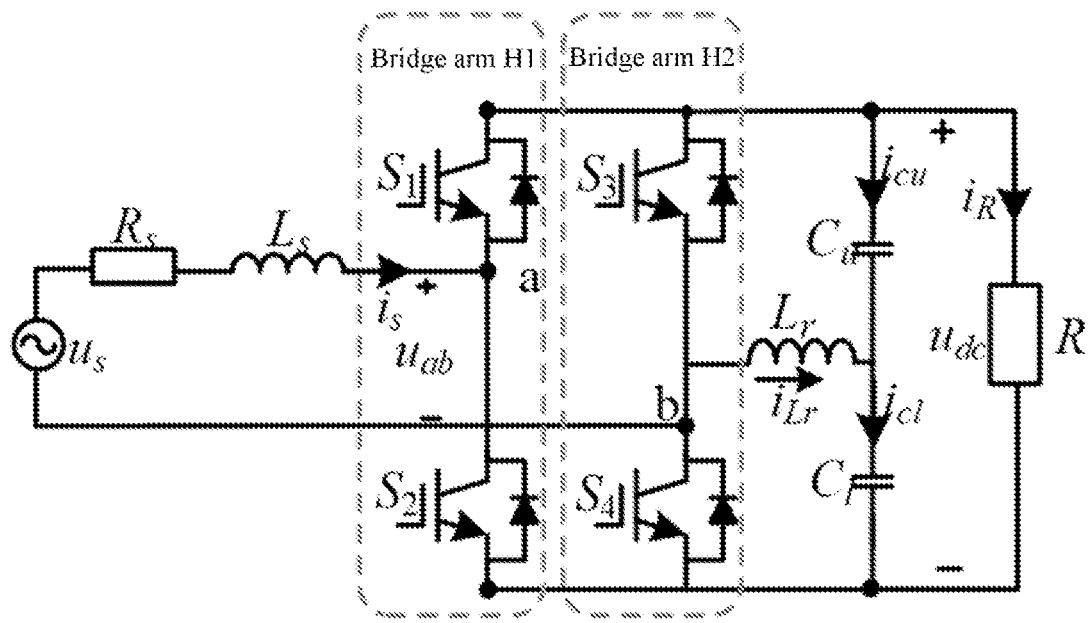
FIG. 3(a) is a schematic diagram of a topology of a single-module single-phase device-multiplexing active power decoupling H-bridge rectifier in Embodiment 1.
Figure 3B:
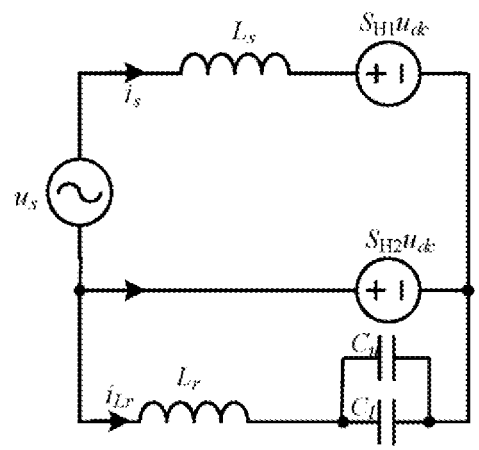
FIG. 3(b) is an equivalent circuit of FIG. 3(a)

A topology of single-module single-phase device-multiplexing active power decoupling is shown in FIG. 3(a), and an equivalent circuit thereof is shown in FIG. 3(b). It can be learned according to Kirchhoff's law that:

$$\begin{cases} L_s \dfrac{di_s}{dt} = u_c + u_r + u_s - S_{H1}u_{dc} \\ L_r \dfrac{di_{Lr}}{dt} = u_c - S_{H2}u_{dc} \end{cases}$$

It can be seen that in a capacitor-separated decoupling topology, a decoupling unit and a rectification unit share the bridge arm H2, a decoupling inductor current $i_{Lr}$ is controlled only by the bridge arm H2, and the decoupling inductor Lr and the decoupling capacitor $C_u=C_l=C$ are relatively independent of a grid-side voltage source, which does not affect modular cascade.

It is assumed that the system works under 50 Hz power frequency conditions. As an inductance value of the inductor $L_s$ is relatively small, a loss thereof is neglected. Moreover, the decoupling capacitor is $C_u=C_l=C$. Then a secondary ripple power in an input power is shown in formula (1).

$$P_r = -1/2 U_s I_s \cos(2\omega t) \tag{1}$$

To implement active power decoupling so that an average voltage of the decoupling capacitors is $U_{dc}/2$ and superimposed onto a fundamental AC component with a phase difference of 180°, voltages $u_{cu}$ and $u_{cl}$ of the decoupling capacitors $C_u$ and $C_l$ may be shown in formulas (2) and (3).

$$u_{cu} = \frac{U_{dc}}{2} + U_c \sin(\omega t + \theta) \tag{2}$$

$$u_{cl} = \frac{U_{dc}}{2} - U_c \sin(\omega t + \theta) \tag{3}$$

In the formulas, $U_c$ is a voltage peak value of an AC component of the decoupling capacitor, and θ is a phase angle between the AC component of the decoupling capacitor voltage and the grid-side voltage.

Currents $i_{cu}$ and $i_{cu}$ flowing through the capacitor are shown in formulas (4) and (5).

$$i_{cu} = C\frac{du_{cu}}{dt} = \omega U_c \cos(\omega t + \theta) \tag{4}$$

$$i_{cl} = C\frac{du_{cl}}{dt} = -\omega U_c \cos(\omega t + \theta) \tag{5}$$

A power $p_c$ generated by the decoupling capacitor is:

$$P_c = u_{cu}i_{cu} + u_{cl}i_{cl} = \omega U_c^2 \sin(2\omega t + 2\theta) \tag{6}$$

To implement power decoupling, the power $p_c$ of the decoupling capacitor is equal to the secondary ripple power $p_r$, and the following can be obtained from formulas (6) and (1):

$$\theta = -\frac{\pi}{4} \text{ or } \theta = \frac{3\pi}{4} \quad (7)$$

$$U_c = \sqrt{\frac{U_s I_s}{2\omega}} \quad (8)$$

To determine the phase angle $\theta$, the following analyzes current stress of a power switching device of the bridge arm H2 of the topology, and the decoupling inductor current $i_{Lr}$ can be obtained by the following formula:

$$i_{Lr} = i_{cf} - i_{cu} = -2\omega U_c \cos(\omega t + \theta) \quad (9)$$

A current $i_{H2}$ of a power switching transistor of the bridge arm H2 may be represented as follows:

$$i_{H2} = i_s + i_{Lr} \quad (10)$$

An effective value $I_{H2}$ of the current of the power switching transistor of the bridge arm H2 may be represented as follows:

$$I_{H2} = \frac{|i_s + i_{Lr}|}{\sqrt{2}} = \frac{1}{\sqrt{2}}\sqrt{(I_s + 2\omega U_c \sin\theta)^2 + (2\omega U_c \cos\theta)^2} = \frac{1}{\sqrt{2}}\sqrt{(I_s^2 + (2\omega U_c)^2 + 4\omega U_c I_s \sin\theta)} \quad (11)$$

It can be seen from formula (11) that when $\theta = -\pi/4$, an effective value of the current flowing through the bridge arm H2 switching transistor is relatively small. From the perspective of reducing the current stress of the power device, $\theta = -\pi/4$.

$\theta = -\pi/4$ and formula (8) are substituted into formula (9) to obtain:

$$i_{Lr} = -\sqrt{2\omega U_c I_s} \cos\left(\omega t - \frac{\pi}{4}\right) \quad (12)$$

Then the decoupling inductor current is controlled as shown in formula (12), to implement the active power decoupling control. As analyzed from the perspective of power, formula (12) may be transformed into the following form:

$$i_{Lr} = -2\sqrt{\omega P} \cos\left(\omega t - \frac{\pi}{4}\right) \quad (13)$$

Figure 4:
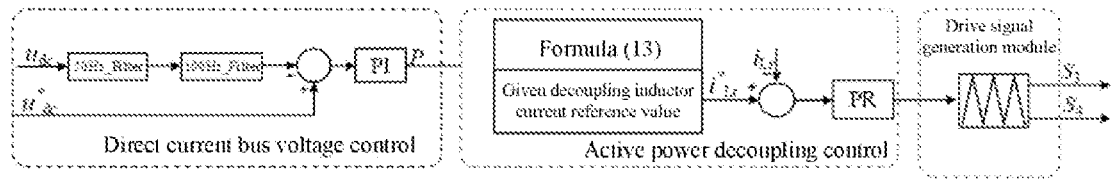
FIG. 4 is a schematic diagram of a control policy of active power decoupling in Embodiment 1.

In the formula, P is $(U_s I_s)/2$, and is an instantaneous voltage amplitude of the system when the rectifier is actually working. Thus, an active power decoupling control policy based on a combination of closed-loop voltage control and formula calculation is provided, as shown in FIG. 4. The DC bus voltage closed-loop control outputs P representing the instantaneous voltage of the system. The reference value of the decoupling inductor current can be obtained by using formula (13), and then a difference is calculated between the reference value and a decoupling inductor current actually measured by the circuit. A modulation wave is generated by the PR controller. A drive signal of the decoupling bridge arm is generated after the modulation wave is compared with a carrier.

Figure 5:
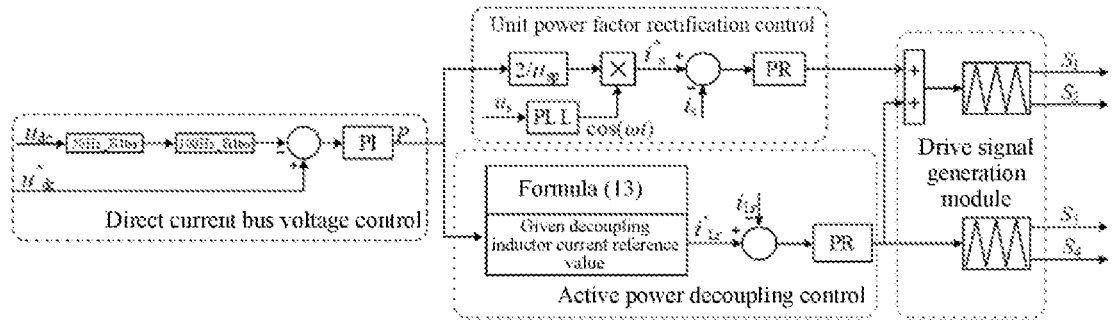
FIG. 5 is a schematic diagram of a control policy of a single-module single-phase device-multiplexing active power decoupling H-bridge cascaded rectifier in Embodiment 1.

The single-module active power decoupling system has two control objectives. One is to achieve grid-side inductor current control, that is, to achieve unit power factor rectification; the other is to achieve active power decoupling control. A block diagram of control of a single-module H-bridge device-multiplexing active power decoupling rectifier is shown in FIG. 5. There are four control modules in total: a DC bus voltage control module, a unit power factor rectification control module, an active power decoupling control module, and a drive signal generation module.

The decoupling inductor current can be controlled only by controlling the H2 bridge arm switching transistor in the topology to be on or off, to realize active power decoupling. In addition, impact of active power decoupling control on the circuit is coupled to unit power factor rectification control, and therefore, a modulation wave of the rectification bridge arm needs to be superimposed onto a modulation wave generated by the active power decoupling control module. In this topology, each modulation wave controls only one bridge arm, and therefore, a modulation method may be unipolar modulation.

Embodiment 2

In this embodiment, n=2, that is, a single-phase device-multiplexing active power decoupling rectifier includes two device-multiplexing active power decoupling H-bridge units that are cascaded. A control policy thereof is studied, a simulation model is built in Matlab/Simulink, and correctness and effectiveness of the proposed control policy is verified.

Figure 6:
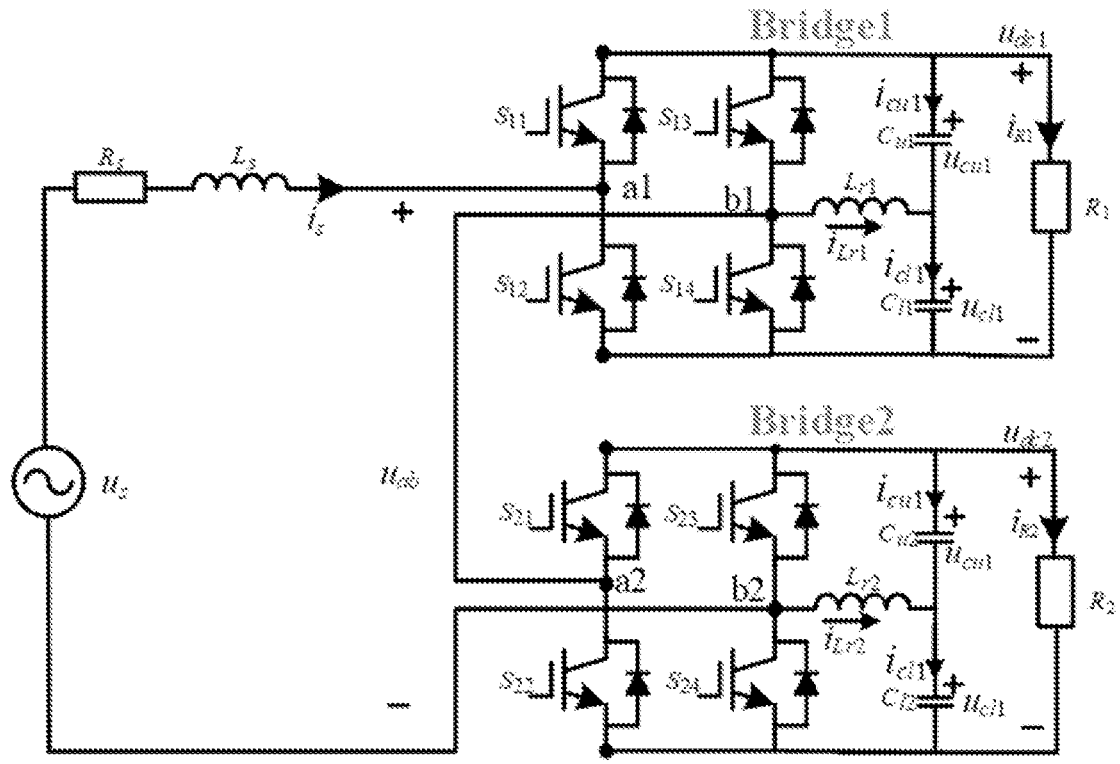
FIG. 6 is a schematic diagram of a topology of a two-module single-phase device-multiplexing active power decoupling H-bridge cascaded rectifier in Embodiment 2.

FIG. 6 shows a single-phase CHBR device-multiplexing active power topology with two modules cascaded. The entire system includes two single-phase H-bridge rectifier device-multiplexing active power decoupling units that are cascaded. DC-side capacitors $C_{u1}$, $C_{l1}$, $C_{u2}$, and $C_{el2}$ of the units are decoupling capacitors of Bridge 1 and Bridge 2 respectively, $u_{cu1}$, $u_{cl2}$, $u_{cu2}$, and $u_{cl2}$ are decoupling capacitor voltages; $L_{r1}$ and $L_{r2}$ are decoupling inductors, and $i_{Lr1}$ and $i_{Lr2}$ are currents flowing through the decoupling inductors $L_{r1}$ and $L_{r2}$; $R_1$ and $R_2$ are DC-side resistive loads, and $u_{dc1}$ and $u_{dc2}$ are DC-side output voltages.

The single-phase CHBR device-multiplexing active power decoupling system includes three control objectives: first, performing grid-side current control, to implement a unit power factor rectification function; second, performing DC-side voltage equilibration control of the cascaded units, to ensure that the system runs stably when system parameters are inconsistent or the load changes suddenly, which is also a premise for implementation of active power decoupling control function; third, performing active power decoupling control, to suppress DC-side voltage fluctuations.

Figure 7:
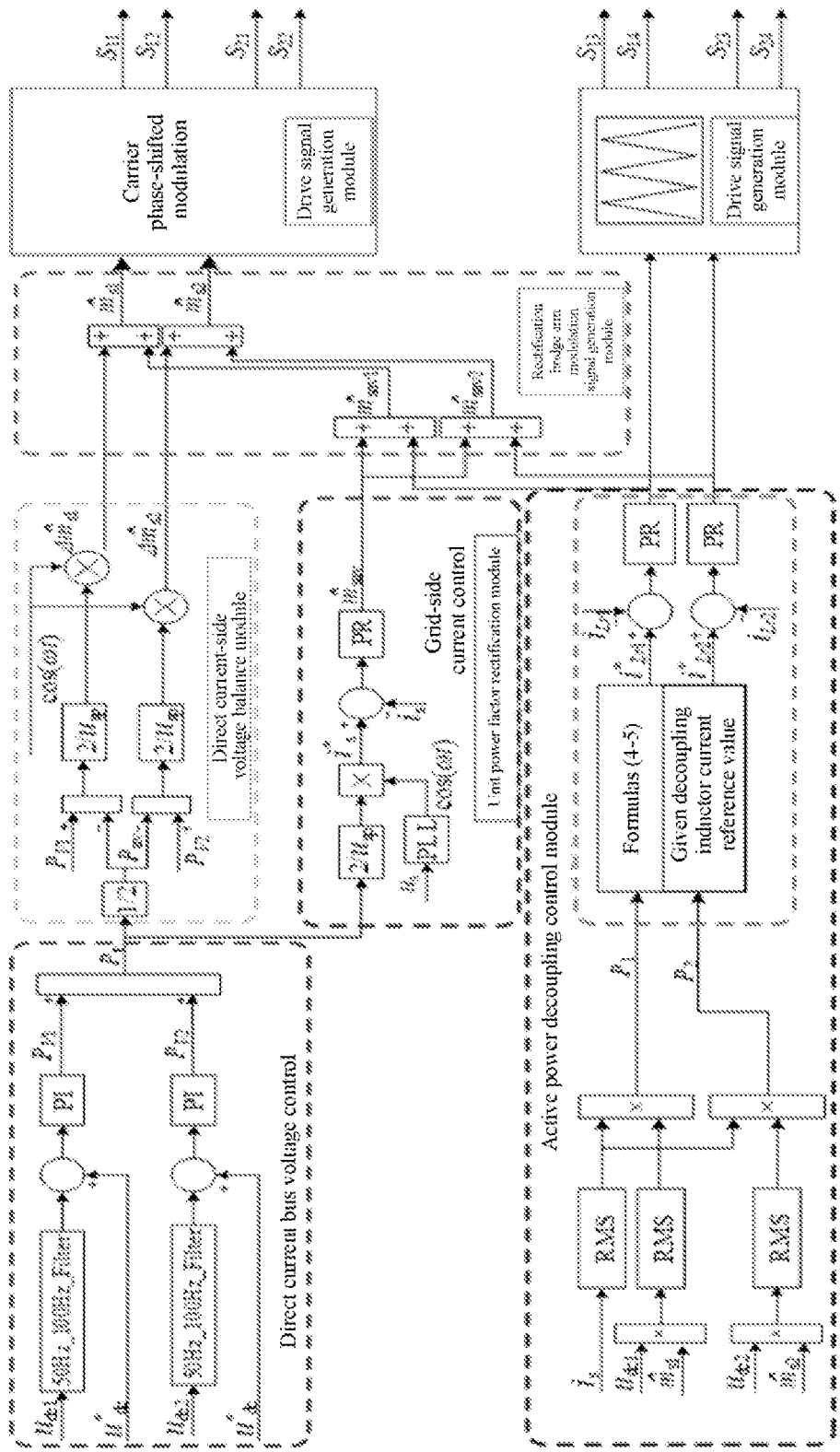
FIG. 7 is a schematic diagram of a control policy of a two-module single-phase device-multiplexing active power decoupling H-bridge cascaded rectifier in Embodiment 2.

A single-phase CHBR device-multiplexing active power decoupling control policy is shown in FIG. 7. The control system includes six modules in total: a DC bus voltage control module, a voltage balance control module, a unit power factor rectification module, an active power decoupling control module (for decoupling bridge arm modulation signal generation), a rectification bridge arm modulation signal generation module, and a power switching transistor drive signal generation module.

The DC bus voltage control module generates a total system voltage through DC-side voltage closed-loop control, for voltage balance and unit power factor rectification. The DC-side voltage balance module generates respective deviation modulation signal factors based on deviations between an average voltage of the system and virtual instantaneous voltages of the two cascaded units. The unit power factor rectification module controls a grid-side inductor current to follow a current reference value i*$_s$ through a PR controller. The active power decoupling control module generates decoupling inductor current reference values i*$_{Lr1}$ and i*$_{Lr2}$ based on a power outer loop, controls the currents of the decoupling inductors $L_{r1}$ and $L_{r2}$ to follow a given value, and generates a modulated wave signal of a decoupling bridge arm. A modulated wave signal of a rectification bridge arm should be superimposed onto the modulated wave signal m$_{sav}$ generated by the unit power factor rectification module with impact of the active power decoupling control module, to produce modulation signals m$_{sav1}$ and m$_{sav2}$ of the two units. When parameters of the two units are inconsistent, deviation modulation signals Δm$_{s1}$ and Δm$_{s2}$ generated by the voltage balance module need to be further superimposed thereon, to finally generate modulation signals m$_{s1}$ and m$_{s2}$ of the rectification bridge arm. The drive signal generation module includes two parts: a rectification bridge arm drive signal and a decoupling bridge arm drive signal. The rectification bridge arm uses a carrier phase-shifted modulation algorithm. A triangular carrier of Bridge n lags 180°/n behind that of Bridge 1, which are compared with a modulated wave to generate a drive signal of a rectification bridge arm of each unit. Under unit power factor rectification conditions, a decoupling capacitor AC voltage component and a grid-side power voltage phase angle θ are determined, decoupling control between units is not affected by unit power factor rectification, power decoupling control between the units has no coupling, and a modulation signal outputted by a decoupling inductor current loop between the units is directly compared with the carrier to generate a decoupling bridge arm drive signal.

Simulation analysis of single-phase CHBR system device-multiplexing active power decoupling To verify effectiveness of the single-phase CHBR system control policy, a single-phase device-multiplexing active power decoupling simulation model is built in Matlab/Simulink when n=2, that is, when the quantity of cascaded units is 2. The proposed integrated control policy of voltage balance and device-multiplexing active power decoupling is simulated and verified. Simulation parameters are shown in Table 1.

TABLE 1

Simulation parameters of the single-phase CHBR system

| Simulation parameter | Value |
| --- | --- |
| Effective value of grid voltage μ$_s$/V | 400 |
| Grid frequency f/Hz | 50 |
| Grid inductor L$_s$/mH | 12 |
| Quantity of cascaded units | 2 |
| Decoupling capacitor C$_{u1}$ C$_{l1}$ C$_{u2}$ C$_{l2}$/uF | 100 |
| Decoupling inductor L$_{r1}$ L$_{r2}$/mH | 3 |
| DC-side output voltage U$_{dc1}$ U$_{dc1}$/V | 800 |
| Total output power/kW | 8 |
| Switching frequency f$_s$/kHz | 20 |

Figure 8A:
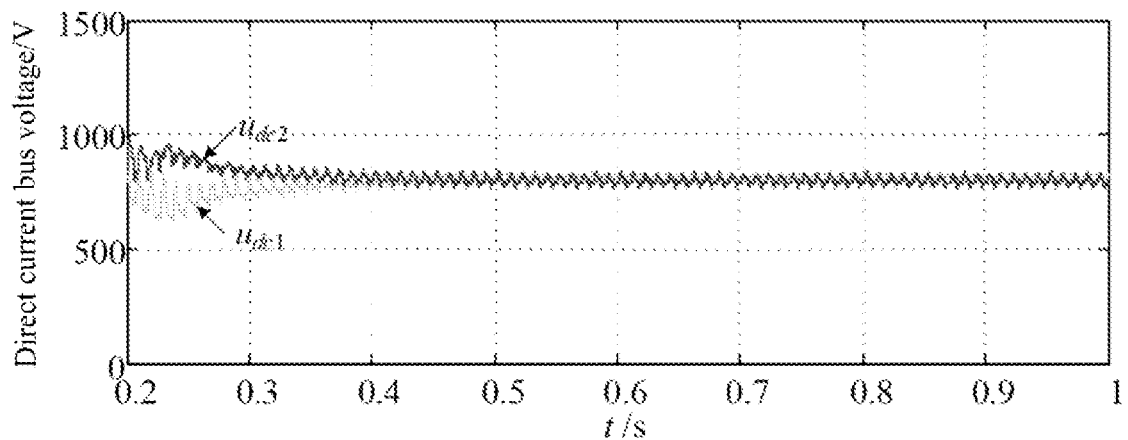
FIG. 8(a) shows waveforms of DC-side output voltages when two modules are cascaded in Embodiment 2.
Figure 8B:
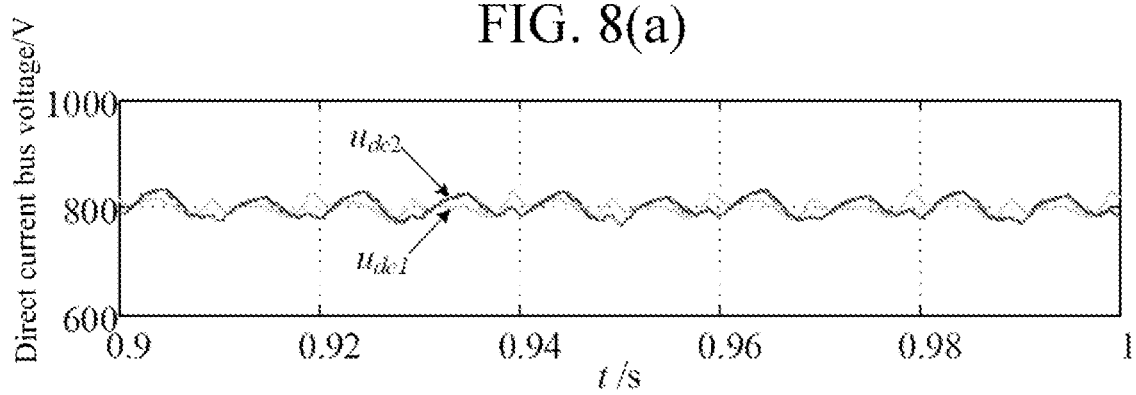
FIG. 8(b) shows waveforms of DC-side voltages of two modules in a time period of 0.9-1.0 s in Embodiment 2.
Figure 9A:
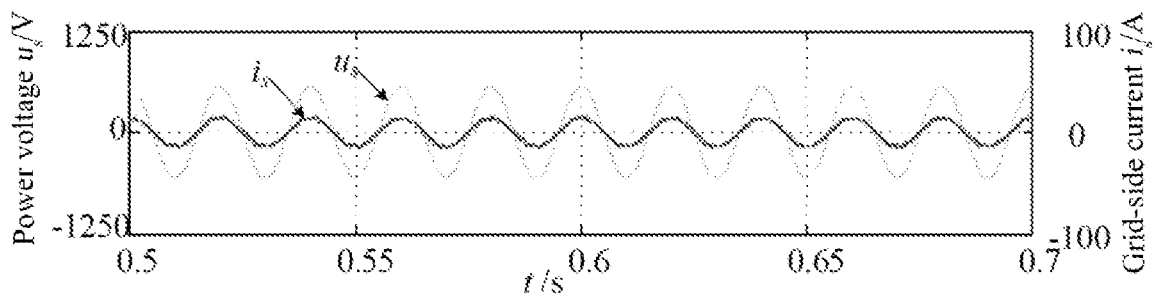
FIG. 9(a) shows waveforms of a grid-side voltage and current in Embodiment 2.
Figure 9B:
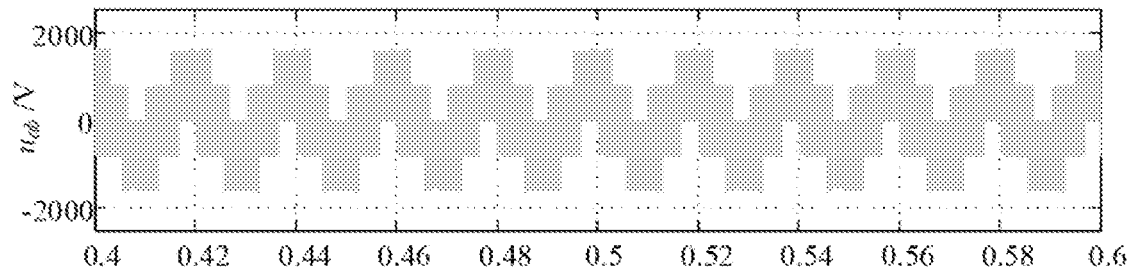
FIG. 9(b) shows a waveform of an input-side voltage in Embodiment 2.

Simulation analysis of load unbalanced startup device-multiplexing active power decoupling The simulation process is as follows: When the system starts, DC-side resistive loads are set to R$_1$=180Ω and R$_2$=140Ω, and therefore, the system starts with unbalanced loads. FIG. 8(a) shows waveforms of DC-side output voltages of two modules, and FIG. 8(b) shows DC-side voltages of the two modules in a time period of 0.9-1.0 s, which achieves a decoupling effect. FIG. 9(a) shows grid-side voltage and current waveforms, and it can be seen from the figure that the system is operating in a unit power factor rectification state. FIG. 9(b) shows a waveform of an input-side voltage U$_{ab}$ that presents a five-step wave state.

Figure 10:
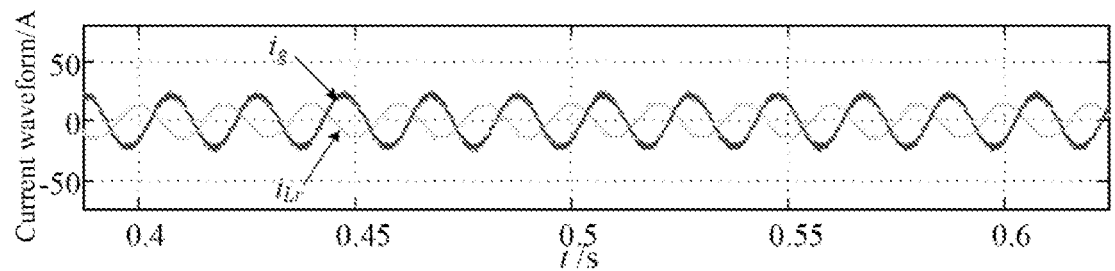
FIG. 10 shows grid-side current and decoupling inductor current waveforms in Embodiment 2.
Figure 11:
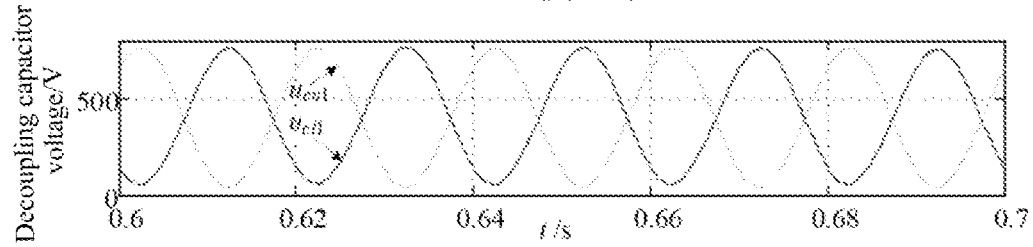
FIG. 11 shows waveforms of decoupling capacitor voltages in Embodiment 2.

When the simulation model is built in Simulink, the grid-side voltage is given as u$_s$=U$_s$ cosωt. According to the single-module analysis process, θ is selected as −3/4π, that is, a phase of a decoupling inductor current lags 3/4π behind a phase of a grid-side current. FIG. 10 shows grid-side current and decoupling inductor current waveforms. It can be seen that the decoupling inductor current i$_{Lr}$ lags 3/4π behind the grid-side current i$_g$, which is consistent with the theoretical analysis. FIG. 11 shows waveforms of decoupling capacitor voltages, which are obtained by superimposing a 400 V DC onto voltages with a phase difference of 180°.

Figure 12:
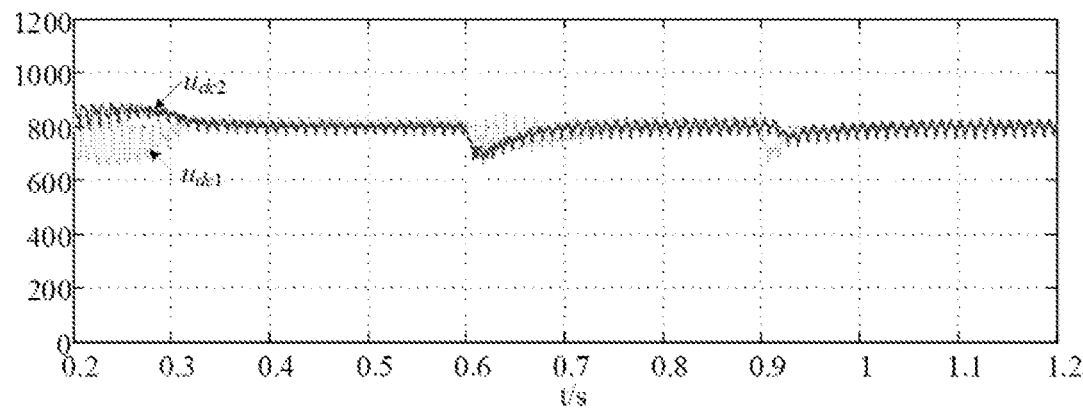
FIG. 12 shows waveforms of DC bus voltages in Embodiment 2.
Figure 13A:
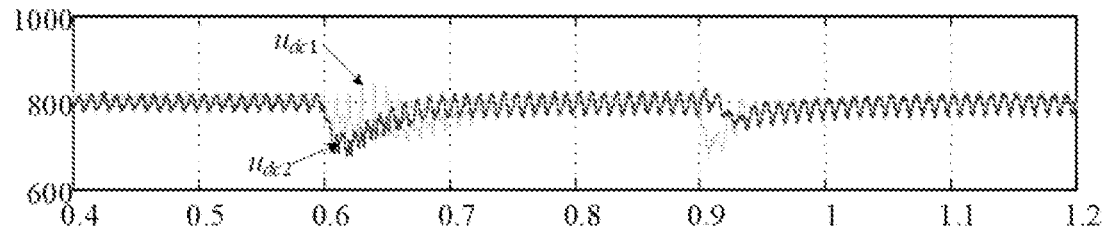
FIG. 13(a) to FIG. 13(d) show waveforms of simulated DC output voltages of two modules after adjustment and stabilization at each stage.
Figure 13B:
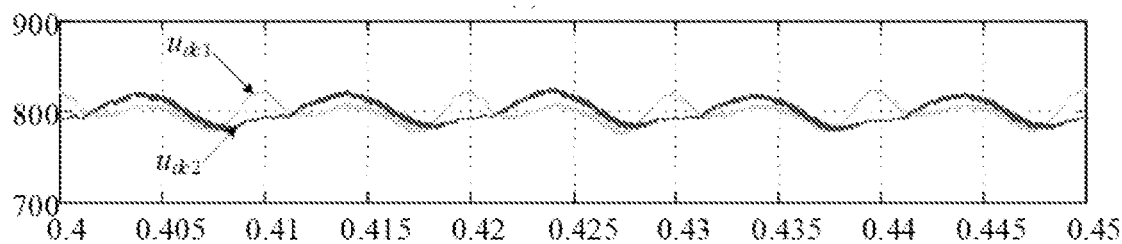
Figure 13C:
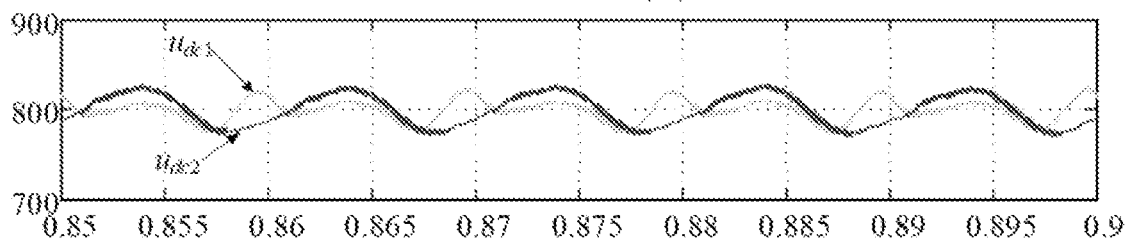
Figure 13D:
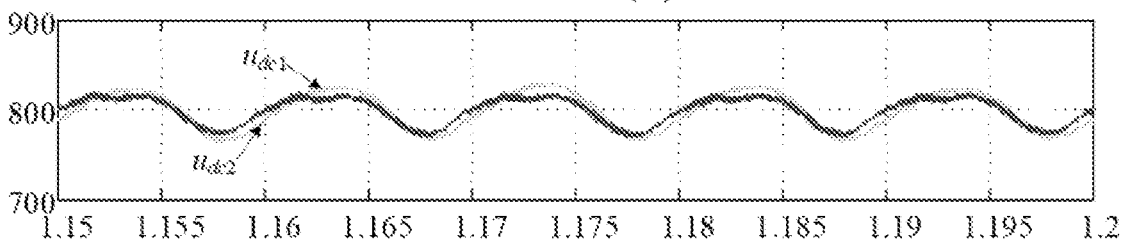

Simulation analysis of device-multiplexing active power decoupling under conditions of sudden load changes To verify effectiveness of the control policy when the system is under load unbalanced conditions, a simulation analysis of the system under conditions of load unbalanced start-up and sudden load changes is carried out. FIG. 12 shows waveforms of DC-side output voltages of two modules of an entire simulation process. FIG. 13(a) to FIG. 13(d) show waveforms of simulated DC output voltages of two modules after adjustment and stabilization at each stage. The simulation process is as follows: At the time of system startup, DC-side resistive loads are R$_1$=200Ω and R$_2$=120Ω, resulting in load unbalanced startup, and DC-side voltages of the two modules are balanced at 0.25 s; R$_1$ and R$_2$ both suddenly change to 160Ω at 0.4 s, and DC-side voltages of the two modules are balanced at 0.7 s; R$_1$ changes to 200Ω and R$_2$ changes to 120Ω at 0.9 s, and voltages of the two modules are balanced at 0.95 s.

FIG. 13(a) to FIG. 13(d) show waveforms of simulated DC output voltages of two modules after adjustment and stabilization at each stage. Each simulation stage and DC-side voltage fluctuations of the two modules are analyzed by using FFT of powergui in Simulink. It can be seen from FIG. 12 and FIG. 13(a) to FIG. 13(d) that under the integrated control policy of DC-side voltage balance and device-multiplexing active power decoupling, the system can still implement the DC-side voltage balance and the secondary ripple power suppression under conditions of load unbalanced startup and sudden load changes during system operation, and effectiveness of the proposed control policy is verified.

Embodiment 3

In one or more implementations, a terminal device is provided, including a server. The server includes a memory, a processor, and a computer program stored in the memory and capable of being run on the processor, and the processor, when executing the program, implements the control policy in Embodiment 1. For brevity, details are not described herein again.

It should be understood that in this embodiment, the processor may be a central processing unit (CPU); or the processor may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general-purpose processor may be a microprocessor, or the processor may also be any conventional processor or the like.

The memory may include a read-only memory and a random-access memory, and provide an instruction and data to the processor. A part of the memory may further include a non-volatile random-access memory. For example, the memory may further store information about a device type.

During implementation, the steps of the foregoing method may be completed through an integrated logic circuit of hardware or an instruction in the form of software in the processor.

The control policy in Embodiment 1 may be directly performed and completed by a hardware processor, or may be performed and completed by using a combination of hardware in the processor and a software module. The software module may be located in a mature storage medium in the field such as a random access memory, a flash memory, a read-only memory, a programmable read-only memory, an electrically erasable programmable memory, or a register. The storage medium is located in the memory, and the processor reads information in the memory and completes the steps of the foregoing method in combination with the hardware in the processor. To avoid repetition, details are not described herein again.

A person of ordinary skill in the art may notice that the exemplary units and algorithm steps described with reference to this embodiment can be implemented in electronic hardware, or a combination of computer software and electronic hardware. Whether these functions are implemented in hardware or software depends on the specific application and design constraints of the technical scheme. A person skilled in the art may use different methods to implement the described functions for each particular application, but it is not to be considered that the implementation goes beyond the scope of this application.

The specific implementations of the present invention are described above with reference to the accompanying drawings, but are not intended to limit the protection scope of the present invention. Those skilled in the art should understand that various modifications or deformations may be made without creative efforts based on the technical solutions of the present invention, and such modifications or deformations shall fall within the protection scope of the present invention.

What is claimed is:

1. A control method of a multi-module single-phase device-multiplexing active power decoupling cascaded rectifier,
    the rectifier comprising:
        n device-multiplexing active power decoupling H-bridge units that are cascaded, n≥2; each device-multiplexing active power decoupling H-bridge unit comprising: a bridge arm H1 and a bridge arm H2 connected in parallel, a decoupling capacitor branch formed by two capacitors connected in series, and a resistive load; a decoupling inductor being connected in series between a midpoint of the decoupling capacitor branch and a midpoint of the bridge arm H2; and a midpoint of an bridge arm H1 of a first device-multiplexing active power decoupling H-bridge unit being sequentially connected in series to an inductor Ls, a resistor Rs, and a power supply Us, and then connected to a midpoint of a bridge arm H2 of a last device-multiplexing active power decoupling H-bridge unit,
    the control method comprising:
        adding up instantaneous voltages outputted by a controller as a total system voltage through direct current (DC)-side voltage closed-loop control;
        generating, according to a deviation between an instantaneous voltage $P_{vi}$ of each cascaded H-bridge unit and a virtual average voltage, a DC bus voltage deviation modulation signal factor of each cascaded H-bridge unit;
        generating a grid-side current reference value according to the total system voltage, calculating a difference between a grid-side inductor current and the grid-side current reference value, and generating a first modulation signal through a proportional resonance (PR) controller;
        generating a reference value of a decoupling inductor current according to an instantaneous power $P_n$ of each cascaded H-bridge unit, calculating a difference between the decoupling inductor current and the reference value of the decoupling inductor current, and generating a modulated wave signal of a bridge arm H2 of each cascaded H-bridge unit through the PR controller;
        generating a drive signal of the bridge arm H2 of each cascaded H-bridge unit after comparing the modulated wave signal of the bridge arm H2 of each cascaded H-bridge unit with a carrier signal;
        superimposing the modulated wave signal of the bridge arm H2 of each cascaded H-bridge unit onto the first modulation signal and then onto a respective DC bus voltage deviation modulation signal factor, to generate a modulated wave signal of a bridge arm H1 of each cascaded H-bridge unit; and
        generating a drive signal of the bridge arm H1 of each cascaded H-bridge unit based on the modulated wave signal of the bridge arm H1 of each cascaded H-bridge unit through a carrier phase-shifted modulation technology.

2. A terminal device, comprising a processor and a computer-readable storage medium, the processor being configured to implement instructions, the computer-readable storage medium being configured to store a plurality of instructions, the instructions being adapted to be loaded by the processor to perform the control method according to claim 1.

3. A computer-readable storage medium, storing a plurality of instructions, the instructions being adapted to be loaded by a processor of a terminal device to perform the control method according to claim 1.

4. A control system of a multi-module single-phase device-multiplexing active power decoupling cascaded rectifier,
    the rectifier comprising:
        n device-multiplexing active power decoupling H-bridge units that are cascaded, n≥2; each device-multiplexing active power decoupling H-bridge unit comprising: a bridge arm H1 and a bridge arm H2 connected in parallel, a decoupling capacitor branch formed by two capacitors connected in series, and a resistive load; a decoupling inductor being connected in series between a midpoint of the decoupling capacitor branch and a midpoint of the bridge arm H2; and a midpoint of an bridge arm H1 of a first device-multiplexing active power decoupling H-bridge unit being sequentially connected in series to an inductor Ls, a resistor Rs, and a power supply Us, and then connected to a midpoint of a bridge arm H2 of a last device-multiplexing active power decoupling H-bridge unit, the control system comprising:
a second direct current (DC) bus voltage control module, configured to add up instantaneous voltages outputted by a controller as a total system voltage through DC-side voltage closed-loop control;
a voltage balance control module, configured to generate, according to a deviation between an instantaneous voltage $P_{vi}$ of each cascaded H-bridge unit and an average voltage, a DC bus voltage deviation modulation signal factor of each cascaded H-bridge unit;
a second unit power factor rectification module, configured to generate a grid-side current reference value according to the total system voltage, calculate a difference between a grid-side inductor current and the grid-side current reference value, and generate a first modulation signal through a proportional resonance (PR) controller;
a second active power decoupling control module, configured to generate a reference value of a decoupling inductor current according to an instantaneous power $P_n$ of each cascaded H-bridge unit, calculate a difference between the decoupling inductor current and the reference value of the decoupling inductor current, and generate a modulated wave signal of a bridge arm H2 of each cascaded H-bridge unit through the PR controller;
a rectification bridge arm modulation signal generation module, configured to superimpose the modulated wave signal of the bridge arm H2 of each cascaded H-bridge unit onto the first modulation signal and then onto a respective DC bus voltage deviation modulation signal factor, to generate a modulated wave signal of a bridge arm H1 of each cascaded H-bridge unit;
a rectification bridge arm drive signal generation module, configured to generate a drive signal of the bridge arm H1 of each cascaded H-bridge unit based on the modulated wave signal of the bridge arm H1 of each cascaded H-bridge unit through a carrier phase-shifted modulation technology; and
a decoupling bridge arm drive signal generation module, configured to generate a drive signal of the bridge arm H2 of each cascaded H-bridge unit after comparing the modulated wave signal of the bridge arm H2 of each cascaded H-bridge unit with a carrier signal.

5. A control method of a single-phase device-multiplexing active power decoupling cascaded rectifier,
the rectifier comprising: a bridge arm H1 and a bridge arm H2 connected in parallel, a decoupling capacitor branch formed by two capacitors connected in series, and a resistive load; a decoupling inductor being connected in series between a midpoint of the decoupling capacitor branch and a midpoint of the bridge arm H2; and a midpoint of the bridge arm H1 being sequentially connected in series to an inductor Ls, a resistor Rs, and a power supply Us, and then connected to the midpoint of the bridge arm H2, the control method comprising:
generating a system voltage P in a circuit operation through direct current (DC) bus voltage closed loop control;
respectively generating a grid-side current reference value and a reference value of a decoupling inductor current according to the system voltage P;
calculating a difference between a grid-side inductor current and the grid-side current reference value, and generating a first modulation wave through a proportional resonance (PR) controller;
comparing the decoupling inductor current and the reference value of the decoupling inductor current, and generating a second modulation wave through the PR controller;
superimposing the first modulation wave onto the second modulation wave for comparison with a carrier, and generating a first drive signal of a bridge arm H1 switching transistor that is used to drive rectification; and
generating a second drive signal of a bridge arm H2 switching transistor that is used to drive decoupling and rectification after comparing the second modulation wave with the carrier.

6. A terminal device, comprising a processor and a computer-readable storage medium, the processor being configured to implement instructions, the computer-readable storage medium being configured to store a plurality of instructions, the instructions being adapted to be loaded by the processor to perform the control method according to claim 5.

7. A computer-readable storage medium, storing a plurality of instructions, the instructions being adapted to be loaded by a processor of a terminal device to perform the control method according to claim 5.

8. A control system of a single-phase device-multiplexing active power decoupling cascaded rectifier,
the rectifier comprising: a bridge arm H1 and a bridge arm H2 connected in parallel, a decoupling capacitor branch formed by two capacitors connected in series, and a resistive load; a decoupling inductor being connected in series between a midpoint of the decoupling capacitor branch and a midpoint of the bridge arm H2; and a midpoint of the bridge arm H1 being sequentially connected in series to an inductor Ls, a resistor Rs, and a power supply Us, and then connected to the midpoint of the bridge arm H2, the control system comprising:
a first direct current (DC) bus voltage control module, configured to generate a system voltage P in a circuit operation through DC bus voltage closed loop control;
a first unit power factor rectification control module, configured to generate a grid-side current reference value according to the system voltage P, compare a grid-side inductor current with the grid-side current reference value, and generate a first modulation wave through a proportional resonance (PR) controller;
a first active power decoupling control module, configured to generate a reference value of a decoupling inductor current according to the system voltage P, compare the decoupling inductor current with the reference value of the decoupling inductor current, and generate a second modulation wave through the PR controller; and
a first drive signal generation module, configured to superimpose the first modulation wave onto the second modulation wave for comparison with a carrier, generate a first drive signal of a bridge arm H1 switching transistor that is used to drive rectification, and generate a second drive signal of a bridge arm H2 switching transistor that is used to drive decoupling and rectification after comparing the second modulation wave with the carrier.

* * * * *